(12) United States Patent
Bevan

(10) Patent No.: US 7,240,691 B2
(45) Date of Patent: Jul. 10, 2007

(54) ROTARY BLEED VALVE ASSEMBLY

(75) Inventor: Neil Bevan, North Warwickshire (GB)

(73) Assignee: Bevan Engineering Limited, North Warwickshire (GB)

( * ) Notice: Subject to any disclaimer, the term of this patent is extended or adjusted under 35 U.S.C. 154(b) by 510 days.

(21) Appl. No.: 10/474,388

(22) PCT Filed: Apr. 11, 2002

(86) PCT No.: PCT/GB02/01516

§ 371 (c)(1),
(2), (4) Date: Mar. 12, 2004

(87) PCT Pub. No.: WO02/084090

PCT Pub. Date: Oct. 24, 2002

(65) Prior Publication Data

US 2004/0129317 A1    Jul. 8, 2004

(30) Foreign Application Priority Data

Apr. 12, 2001 (GB) .................................. 0109372.3

(51) Int. Cl.
*F16K 37/00* (2006.01)

(52) U.S. Cl. ...................... 137/554; 251/286; 251/305

(58) Field of Classification Search ................ 251/284, 251/286, 287, 385, 129.11, 305; 137/554; 60/785
See application file for complete search history.

(56) References Cited

U.S. PATENT DOCUMENTS

| 2,817,489 | A | * | 12/1957 | Hesmer ....................... 251/208 |
| 3,938,553 | A | * | 2/1976 | Ortega ................... 137/625.47 |
| 4,077,432 | A | * | 3/1978 | Herr ....................... 137/601.06 |
| 4,335,738 | A | * | 6/1982 | Nassir ..................... 137/246.22 |
| 4,339,110 | A | * | 7/1982 | Ortega ......................... 251/309 |
| 4,523,286 | A | * | 6/1985 | Koga et al. .................. 702/183 |
| 4,538,789 | A | * | 9/1985 | An .......................... 251/129.12 |
| 4,794,760 | A | * | 1/1989 | White .......................... 60/785 |
| 5,038,742 | A | * | 8/1991 | Uddin .......................... 123/549 |
| 5,577,474 | A | * | 11/1996 | Livshiz et al. .............. 123/352 |
| 5,678,594 | A | * | 10/1997 | Hill .............................. 137/338 |
| 6,062,205 | A | * | 5/2000 | Bevan et al. ........... 123/568.24 |
| 6,698,717 | B1 | * | 3/2004 | Brookshire et al. ......... 251/305 |
| 6,810,906 | B2 | * | 11/2004 | Tanaka et al. ............ 137/487.5 |

* cited by examiner

*Primary Examiner*—Eric Keasel
*Assistant Examiner*—Craig Price
(74) *Attorney, Agent, or Firm*—Notaro & Michalos P.C.

(57) ABSTRACT

A rotary bleed valve (10) for a gas turbine engine comprises a passage (11) connecting high pressure gases from a compressor to an exhaust and a valve member (12), the valve member (12) may be rotated within the passage (11) so as to vary or if necessary block the flow of compressor gases. The valve member (12) is shaped such that as the member (12) moves from a closed to an open position gas flows around the member (12) induces a torque on the member (12).

14 Claims, 5 Drawing Sheets

ROTARY BLEED VALVE ASSEMBLY

BACKGROUND OF THE INVENTION

This invention relates to a rotary bleed valve assembly particularly but not exclusively for use with a gas turbine engine.

The concept of bleeding or recirculating a controlled variable proportion of compressor gases in a gas turbine engine is well-known. Usually a bleed valve assembly is utilised in the compressor gas flow which can allow bleeding of compressor gases to any desired degree. Hitherto, bleed valve assemblies for this purpose have utilised a valve member which moves rectilinearly across the gas glow to any necessary extent.

Problems arise with use of valve mechanisms which move rectilinearly in this way insofar as they can become easily seized or jammed due to the presence of pollutants in the compressor gases.

Also conventional bleed valves are typically pneumatically actuated and have response times of 200-500 ms. During this response time period, an excessive torsional load can be applied to the drive shafts of a gas turbine. The drive shafts therefore must be stressed accordingly, which increases the mass of the shafts and thereby the mass of the engine.

SUMMARY OF THE INVENTION

It is an object of the present invention to provide rotary bleed valve assembly which overcomes or at least minimises the above mentioned problems. It is also an objective of the present invention to provide such an assembly in which the state thereof can be remotely monitored for faults.

Thus and in accordance with a first aspect of the present invention therefore there is provided a rotary bleed valve assembly for controlling the flow of compressor gases in a gas turbine engine, the assembly comprising a passage connecting in use with high pressure gases from a compressor and a valve member being adapted for rotary movement in said passage to vary flow of compressor gases there around, said member being shaped such that, as the member moves from a closed position to an open position flow of gas around the valve member induces a rotary torque on said member which causes said member to be urged towards said closed position when said member is in a preselected range of valve positions and towards said open position otherwise.

With this arrangement, it is possible to provide a valve assembly which is less prone to jamming due to the presence of pollution in the gases.

Preferably the valve member is shaped such that said induced rotary torque urges said valve member towards said closed position when said valve position is between say 10% and say 60% of fully open and towards said open position otherwise.

Preferably the valve assembly includes a rotary actuator for moving said valve member and preferably the axis by which said valve member is moved by said actuator extends substantially perpendicular to the direction of gas flow in said passage.

Preferably said passage is defined by a housing which also defines a second passage through which the compressor exhausts, the first passage merging with the second passage downstream of said valve member.

Preferably said valve member comprises a generally circular cylindrical spool member rotatably received in a correspondingly cylindrical seating disposed in said housing and intersecting said first passage substantially at right angles thereto, said spool member being shaped in relation to its seating such that in a first angular position of the spool member relative to the seating the valve is closed whilst in a second angular position of spool member relative to the seating gas can flow from the first passage through the valve member to the second passage.

Alternatively the valve member may be of any suitable shape, and where the valve member is not cylindrical, the seating can be of any appropriate configuration to allow the valve assembly to perform its function.

Preferably said second passage comprises first and second angularly disposed passage portions interconnected by an acoustic silencer. Alternatively the second passage may comprise first and second angularly disposed interconnected passage portions and in these circumstances an acoustic silencer may be provided externally of the valve assembly.

Preferably the shaping of said spool member is such that when the valve is opened there is a gas flow between the spool member and its seating on both sides of the axis of the spool member and the shaping of the spool member may be such that as the valve opens, the torque effect acting on the spool member on both sides of its axis as a result of gas flow over the spool member result in a torque on the spool member.

In accordance with a second aspect of the present invention there is provided a gas turbine engine incorporating a rotary bleed valve assembly according to the first aspect of the invention.

In accordance with a third aspect of the present invention there is provided a control assembly for a rotary bleed valve assembly for controlling the flow of compressor gases in a gas turbine engine, the valve assembly comprising a passage connecting in use with high pressure gases from a compressor and a valve member being adapted for rotary movement in said passage to vary flow of compressor gases there around, wherein movement of said valve member is electrically actuated and said control assembly comprises sensing means for detecting the position of the valve member and control means to receive the detected position information from said sensing means and to determine if there is any fault in operation of the valve assembly.

This arrangement allows the valve position to be constantly monitored and hence if the valve fails it allows the gas turbine engine of which the valve is a component to be limited to a safe working region. Additionally electric valve actuation opens the possibility of a faster acting valve, in favourable circumstances <100 ms response time. The combination of these two factors would additionally allow for a weight saving by reducing likely stress loads on the drive shafts of the turbine.

Preferably, if a fault in operation is detected, the control means is operable to cause movement of said valve to a safe position. Preferably said safe position is fully open.

Preferably the electric actuation means is a switched reluctance motor.

Preferably the actuation means is linked to the valve member via a high reduction ratio gearbox. Most preferably the reduction ratio of the gearbox is fixed.

A particularly suitable gearbox is the cyclo gearbox supplied by Sumitomo.

Preferably the position of the valve member is monitored by monitoring the rotation of the motor drive shaft and/or by detecting the presence of compressor gas in the passage beyond the valve element.

In a preferred embodiment a motor drive shaft position is used as the primary mode of valve member position detection and compressor gas detection is used as a secondary mode of detection.

Most preferably there are two motor position sensors and one compressor gas detection sensor. In alternative embodiments either the compressor gas detection sensor or one or both of the motor position sensors may be omitted if desired.

Most preferably the control means monitors the outputs of the valve member position detection sensors and where there is a discrepancy between the sensor outputs the control means drives the valve members accordingly and output a corresponding alarm code.

In accordance with a fourth aspect of the present invention there is provided a gas turbine engine incorporating an electrically actuated rotary bleed valve assembly and a monitoring and control assembly according to the third aspect of the invention.

Preferably the valve member control means is linked to the main engine controller, most preferably by a digital optical link.

BRIEF DESCRIPTION OF THE DRAWINGS

The invention will now be described by way of example only and with reference to the accompanying drawings.

DETAILED DESCRIPTION OF THE PREFERRED EMBODIMENT

Figure 1:
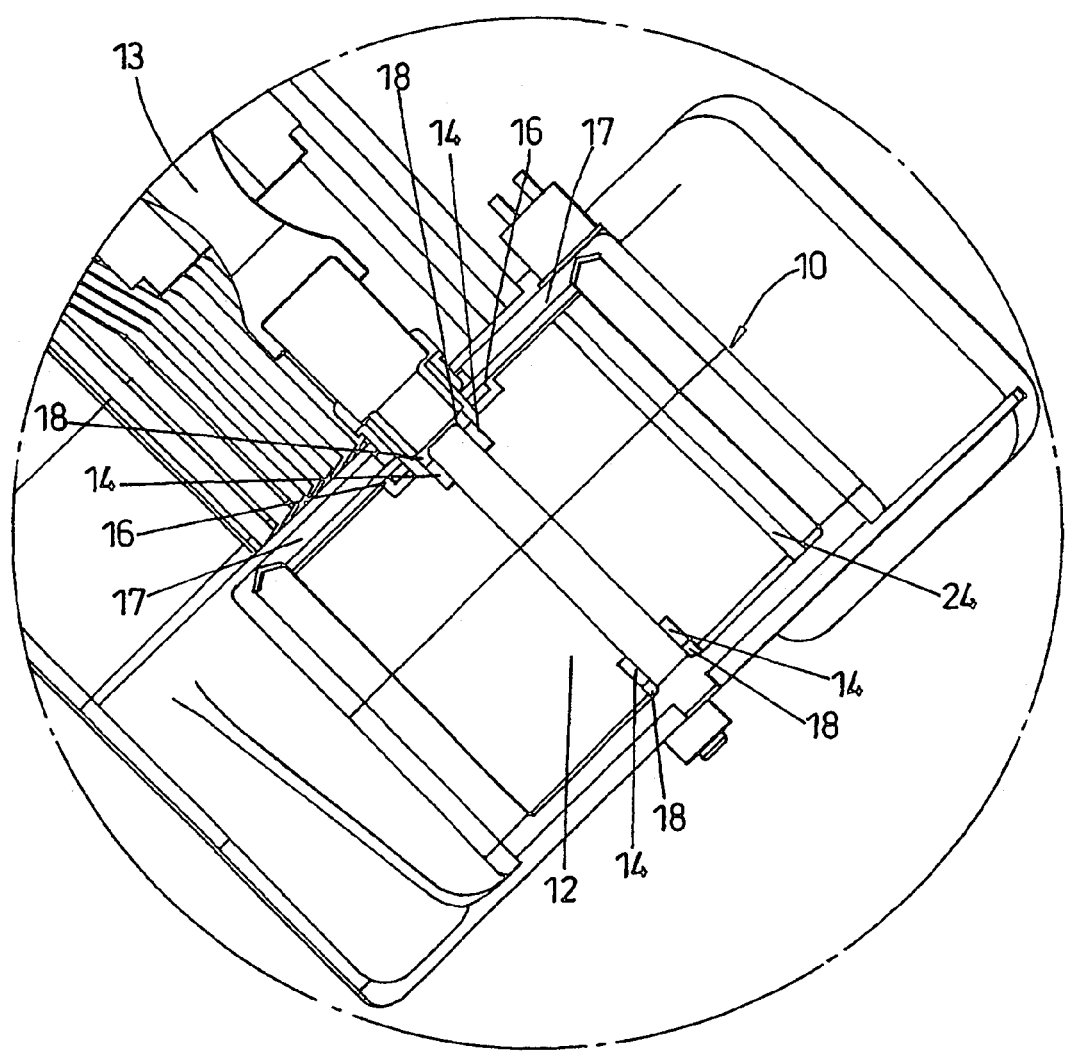
FIG. 1 shows a side view partly in section of one form of rotary bleed valve assembly according to the present invention.

Referring now to the drawings there is shown in FIG. 1, a rotary bleed valve assembly 10 mounted in a passage 11 (shown in FIG. 2a and FIG. 2b) communicating with high pressure compressor gases from a compressor of a turbine engine (not shown).

The valve assembly 10 comprises a valve member 12 mounted on a rotatable actuator shaft 13 by way of rotatable bearings 14. A seal 16 seals an end of the shaft 13 externally of the passage 11 and the seal 16 is covered by a seal cover in the form of a plate 17.

The actuator shaft 13 is connected to a drive motor (not shown) which may comprise a stepper or a torque motor of any suitable form and the drive motor may be linked to the shaft by way of a high reduction gearbox (not shown). The use of a high reduction gearbox between the actuator shaft 13 and the drive motor is to ensure that the valve member 12 can be driven at a relatively low speed of operation with a relatively high torque. Furthermore, it may be necessary to thermally insulate the valve assembly from the aforementioned motor and this can be achieved in any suitable manner.

One suitable form of motor for the valve assembly is a switched reluctance motor which allows fast valve response times (<100 ms) combined with good reliability due to the "single piece rotor" construction. In addition the lack of permanent magnets within a switched reluctance motor allows for high temperature operation.

A particularly suitable gearbox for the valve assembly is the CYCLO (registered trade mark) drive gearbox available from Sumitomo Heavy Industries, Ltd.

It can be seen that the bearings 14 which mount the actuator shaft 13 relative to the passage 11 are not in the gas flow within the passage 11. This assists in prevention of fouling or seizure of the bearings and thus failure of the valve assembly 10. Thus, in the embodiment shown, it can be seen that the bearing 14 on the end of the shaft is contained within a recess 18 in the valve member 12.

Figure 2A:
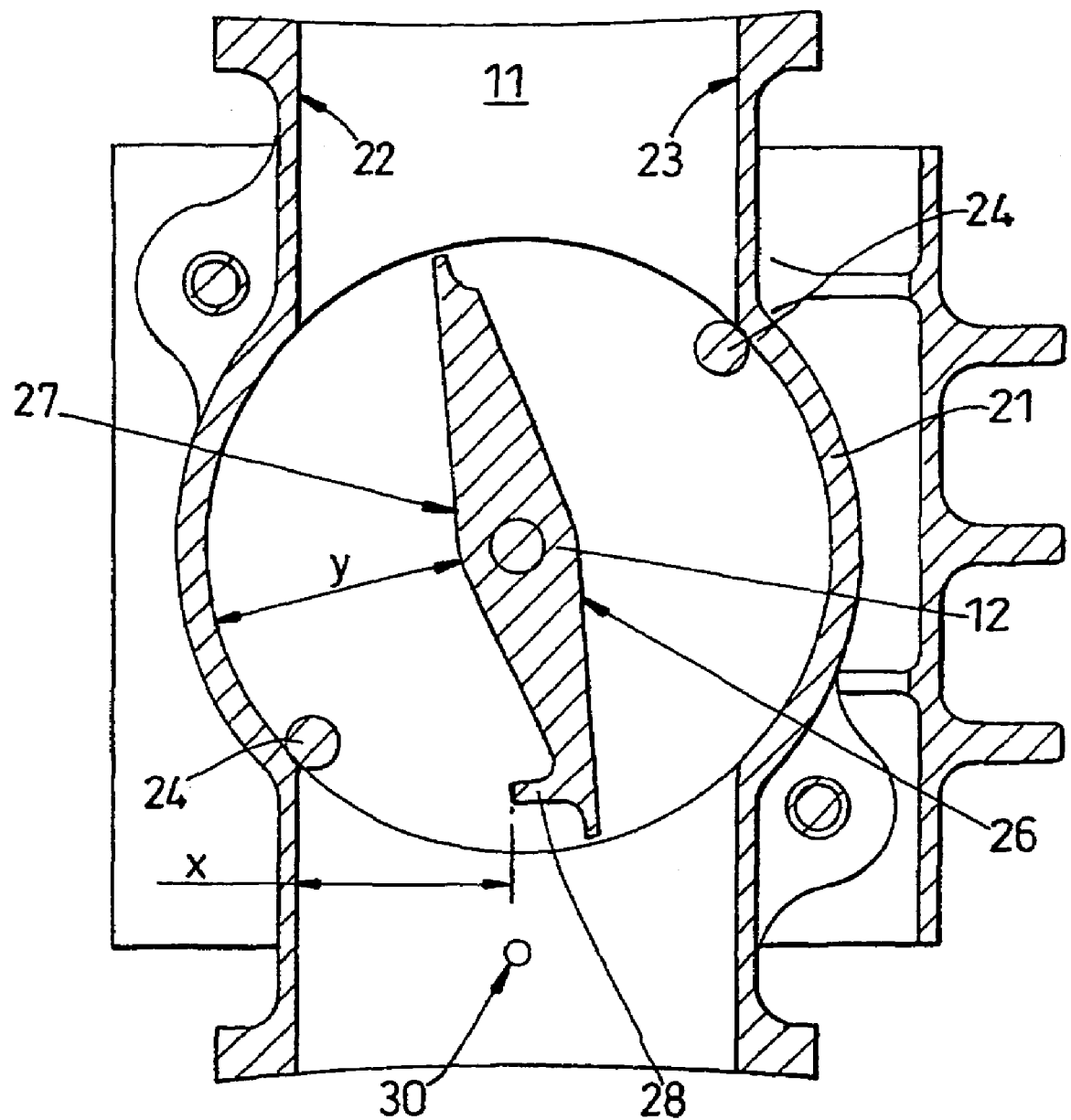
FIG. 2a shows a schematic plan view of the valve member of the assembly of FIG. 1 in the open position.
Figure 2B:
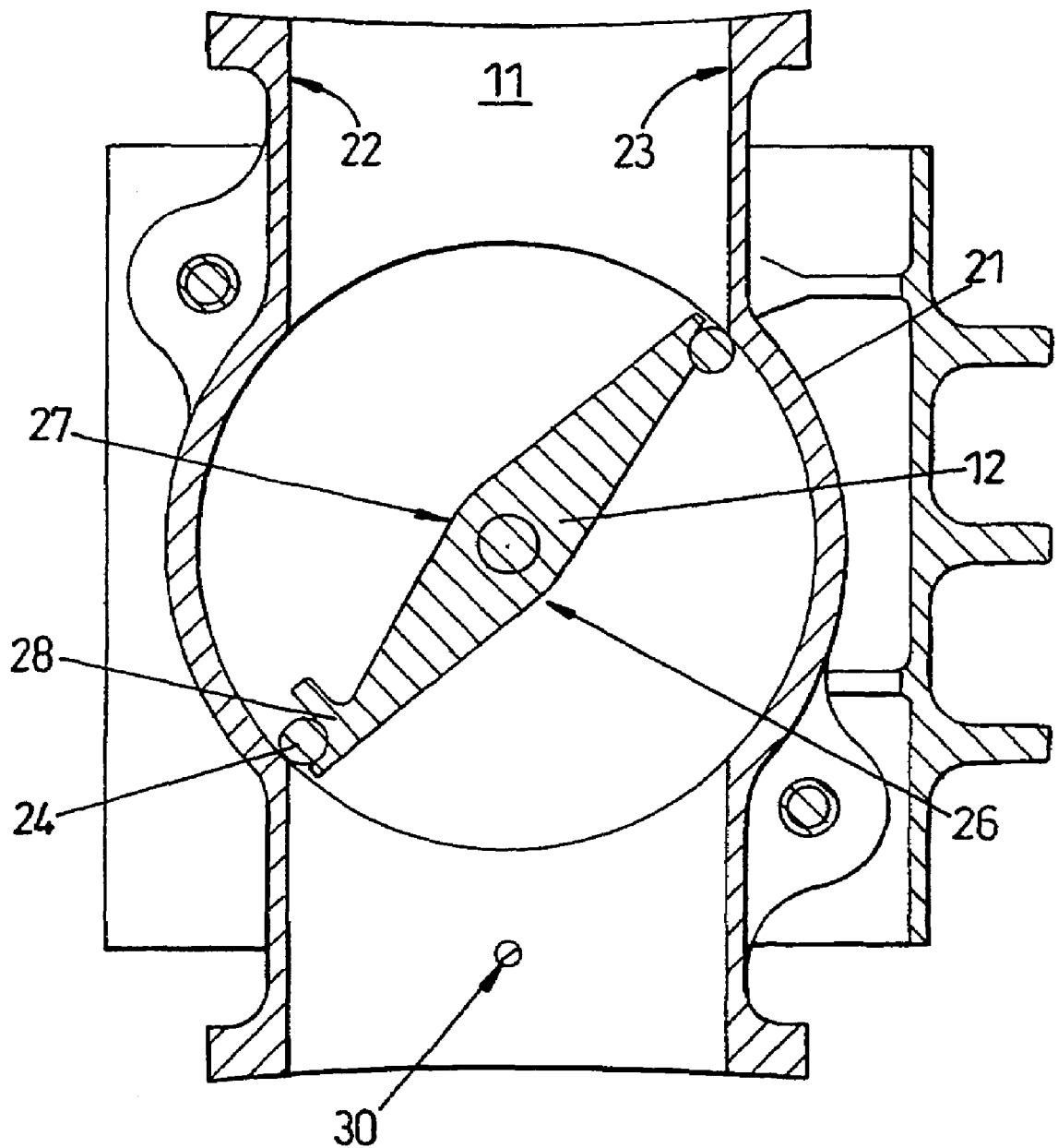
FIG. 2b shows a schematic plan view of the valve member of the assembly of FIG. 1 in the closed position.

The valve member is shown in plan in FIG. 2 and it can be seen that the member 12 is mounted in a valve seating 21 (shown in FIG. 2a and FIG. 2b) defined by the passage walls 22, 23. Sealing members 24 are provided connected to the valve seating 21 against which ends of the valve member 12 abut when the valve is in the closed position to provide an effective seal against the flow of exhaust gases along the passage and through the valve member 12.

The valve member 12 is shaped to define a front upper surface 26, an underneath belly surface 27 and a tail part 28 of the member is generally L-shaped. The particular shaping of the valve member 12 is such as to achieve the particular torque relationships which are to be described hereinafter.

It is known that with conventional valve element layouts there is a pressure distribution tending to close the valve due to the local pressure drop around the metering edge. The novel feature of this valve concept is to have two metering edges (upper and lower surface) and to control the pressure distribution around both edges to produce a required nett torque on the valve member.

In use, the rotary actuator is used to move the valve member 12 between closed and open position and any point in between. Thus, with the valve assembly 10 mounted in the passage as shown in FIGS. 1 and 2, with the valve member in an open position, gas will flow around both sides of the valve member 12 and will therefore flow along the upper surface 26 and the underneath belly surface 27 of the member 12. Driving the actuator shaft, i.e. as shown in FIG. 1 item 13, controls the position of the valve member 12.

For small angle valve openings, gas is unable to flow along the underneath belly surface 27 of the member 12 as a nominal seal is made by the action of the tail 28 onto the adjacent sealing bar 24. Under this condition, the flow of gas is metered over the upper surface 26 of the valve member 12 by a flow area defined between the sealing bar 24 and the upper surface 26. The point on the upper surface 26 that defines the minimum area for the flow will gradually move closer to the centre line of the valve member 12 as the valve opens further. A consequence of this is that a high-pressure zone will be set-up on the upper surface 26. This high-pressure zone will lead to a torque acting on the upper surface 26 of the valve member 12 tending to open the valve member 12.

As the valve opens further, the torque acting on the upper surface 26 of the valve member 12 tending to open the valve member 12 is counteracted to some degree by a torque to close the valve due to the local pressure distribution around the area of the tail 28 of the valve member 12.

As the valve opens further still, the torque acting on the upper surface 26 of the valve member 12 tending to open the valve member 12 dominates the nett torque on the valve such that the valve will tend to open under the aerodynamic torque alone. This means that if the drive for the actuator should fail, the valve member 12 will move into an open position. This is a fail-safe condition since if the valve is closed it is possible for the gas turbine compressor to stall.

For large valve openings, there will be a position where the distance (y) between the underneath belly surface 27 and the seating 21 is small in comparison with the distance (x) between the tail 28 of the valve member 12 and the sealing bar 24 (shown in FIG. 2a). When the valve member 12 reaches this position, the flow over the underneath belly surface 27 of the member 12 causes the pressure distribution to become 'smeared'. The pressure distribution on the underneath belly surface 27 of the member 12 can now be approximated to a smooth pressure drop along the underneath belly surface 27 of the member 12. This pressure distribution, on the underneath belly surface 27 of the member 12, will tend to produce a torque to close the valve but this contribution to the nett torque on the valve member 12 is small compared to that produced by the flow over the upper surface 26 of the valve member 12.

It will be appreciated that for a fast acting and precisely position controlled valve, the large torque required to open the valve member 12 further when already at relatively large openings may be problematic. It will therefore be appreciated that as the valve member 12 is moved towards the open position, under the action of the rotary actuator, the increasing torque generated on the underneath belly surface 27 of the member 12 which attempts to move the valve member 12 back towards the closed position will tend to damp movement of the valve member 12 as it approaches a fully open position.

Figure 4:
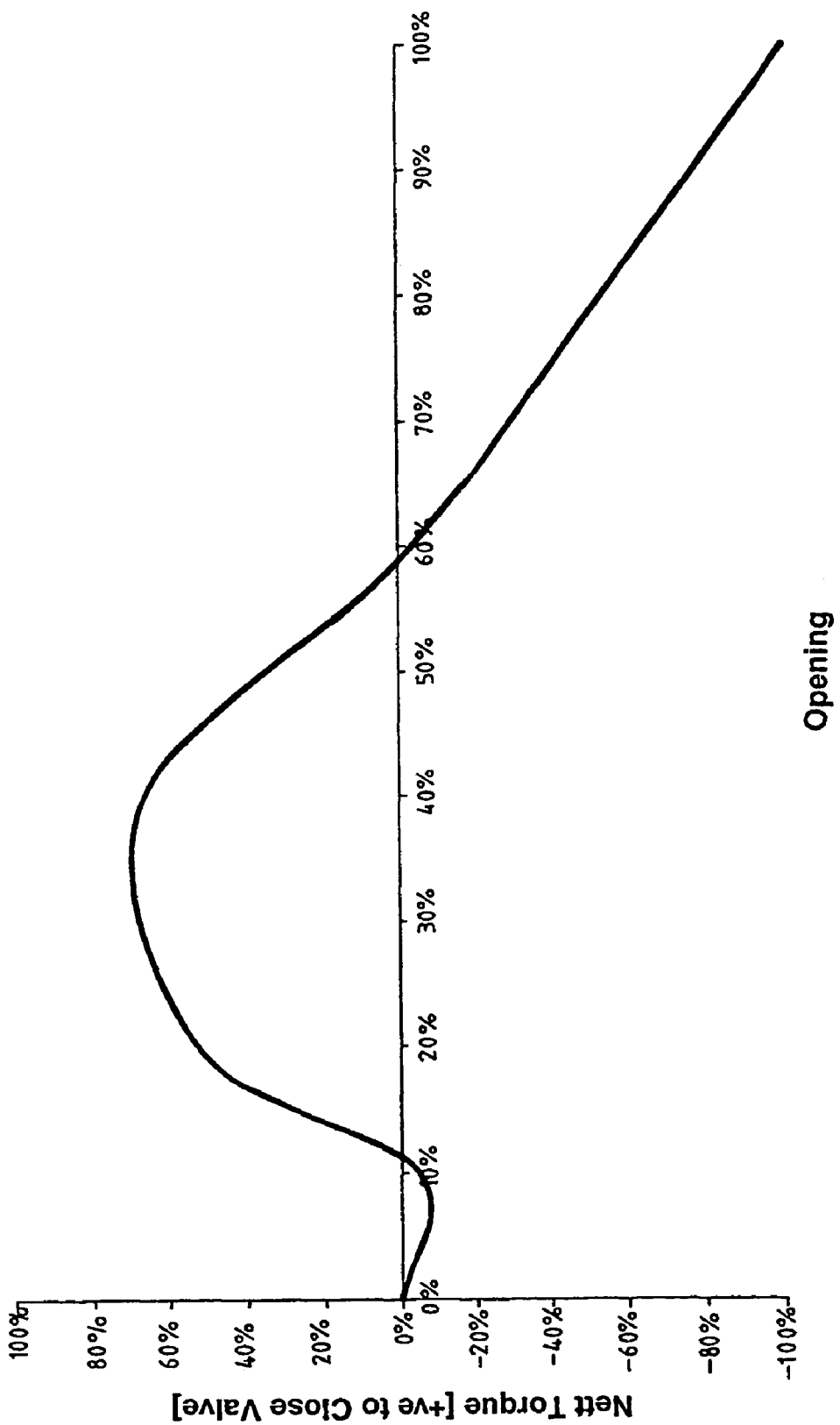
FIG. 4 shows how the nett torque on the valve member varies as the valve member opens in a preferred embodiment of the present invention.

As has been described above there is a change in direction of the nett torque on the valve member 12 dependent on the valve opening. To reiterate this point, as the valve member moves from the closed to the open position, there is initially a flow torque urging the member into an open position, subsequently, when the valve member 12 is say 10% open there is a flow torque urging the member 12 into a closed position which then changes as the member continues to open, to say 60% open, into a torque urging the member 12 into an open position. This is illustrated in FIG. 4.

On closing the valve, the L-shaped portion 28, of the valve member 12 closes against the sealing bar 24 before the seal is made on surface 26. It has previously been discussed that, for small valve openings, a high-pressure zone will act on the upper surface 26 of the valve member 12 tending to open the valve member 12. Under the closing action, this nett flow torque to open the valve will result in a deceleration of the valve member 12 and thus this two-stage sealing mechanism allows for a reduced impact velocity of the valve member 12 on seals 24 to reduce wear and increases useful working lifetime.

Additionally, to further enhance the sealing torque applied from the motor, an aerodynamic torque may be generated by arranging for the areas of valve member 12 exposed to gas flow on each side of shaft 13 to be unequal in size.

It can be seen from FIG. 2 that a thermocouple, or other thermal switch 30 is provided beyond the valve member 12 in the exhaust gas flow and this thermocouple 30 measures the temperature of gases passing beyond the valve member 12. Thus, if the valve member 12 is in the closed position, the thermocouple 30 will detect a low temperature, whereas if the valve member is in an open position and exhaust gases are passing beyond the valve member 12, the thermocouple 30 will detect a warmer temperature. Thus the temperature sensed by the thermocouple 30 can be indicative of the state of the valve member 12, i.e. whether it is in an open or closed position and therefore this information can be used to monitor the correct functioning of the valve member 12.

Figure 3:
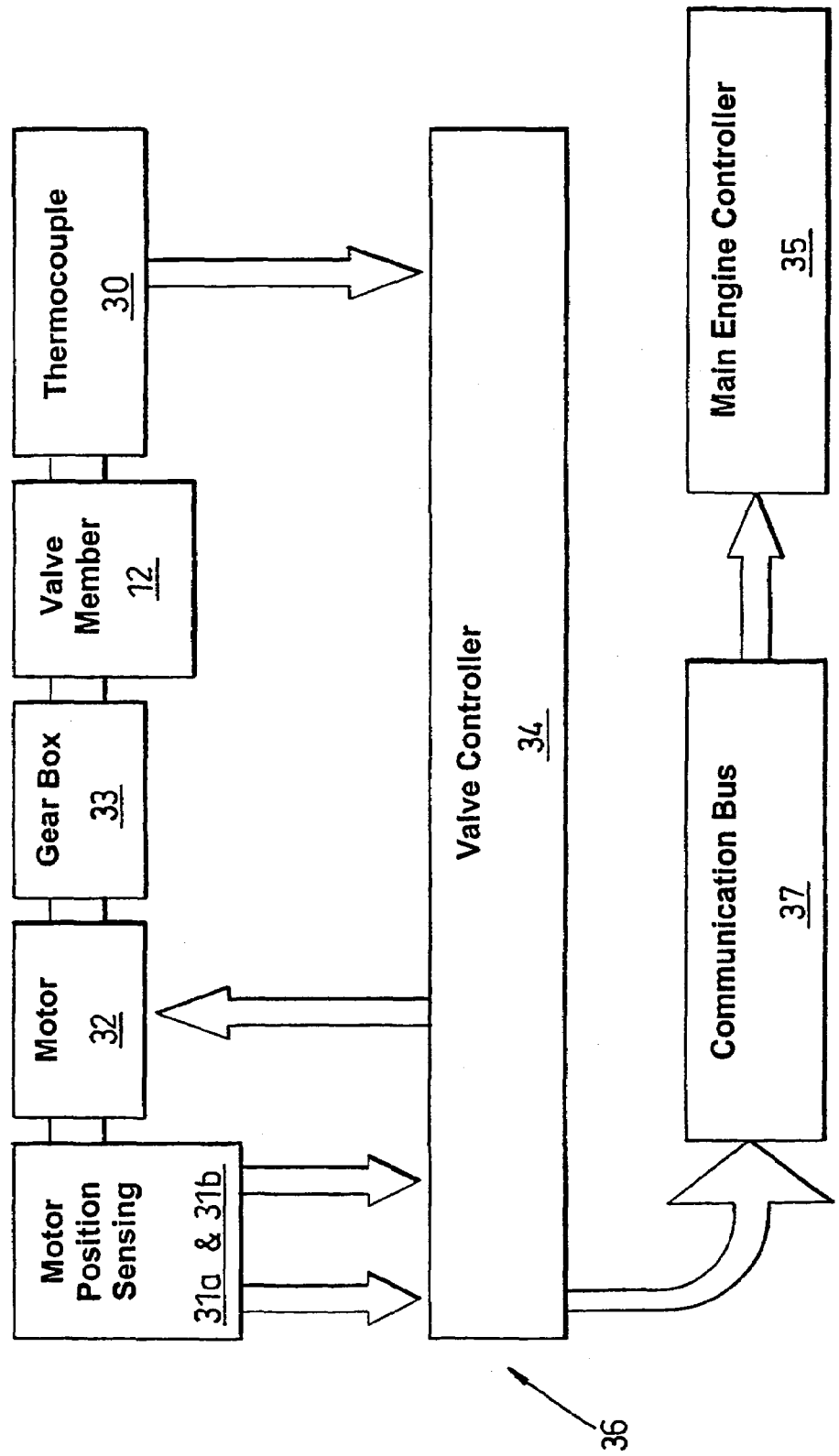
FIG. 3 shows a block diagram of the components of a monitoring and control system for an electrically actuated embodiment of the assembly of FIG. 1.

In an alternative embodiment of the valve assembly 10 the thermocouple 30 can be incorporated in a microprocessor based control assembly 36 as shown in FIG. 3 to monitor the position of valve member 12.

The control assembly 36 incorporates a microprocessor 34 two sensors 31a and 31b which monitor the rotation of the drive shaft of the actuation motor 32 in addition to the thermocouple 30.

The motor 32 drives the valve member 12 between the open and closed positions. As gearbox 33 has a fixed ratio the position of the valve member 12 can be readily inferred from the position of the motor shaft, assuming the shaft has not sheared. As is described further below, such a failure can be detected using the aforementioned sensors.

The provision of two motor shaft position sensors 31a, 31b allows a dual lane (redundant) system to be adopted for motor position sensing. Where there is a discrepancy between the two signals the microprocessor 34 may use the signal from thermocouple 30 to provide a further indication of the valve member 12 position.

The microprocessor may decide on the basis of the signals from sensors 30, 31a and 31b that there is a fault. In such a case the microprocessor 34 will output in any convenient manner a fault code, and in certain circumstances drive the valve member 12 to the fully open (fail safe) position.

To allow valve position to be calibrated the valve member 12 will be cycled to say 25% open and then closed slowly to allow microprocessor 34 to verify the fully closed position.

The microprocessor based control assembly 36 can be provided as part of the valve assembly 10 and the output for the position sensing device 31a and/or the thermocouple can be linked to an overall control system 35 for a whole gas turbine by a databus 37. Any other sensors utilised to monitor operation of the valve assembly, and any warning devices or other systems, can also be connected to the overall control system 35 by the databus 37. The databus 37 link is preferably digital and optical.

It is of course to be understood that the invention is not intended to be restricted to the details of the above embodiment which are described by way of example only.

Whilst the bleed valve is described as being used for bleed of compressor air, it will be appreciated that it can be utilised to control bleed of air in any compatible system e.g. aircraft cabin air systems.

The invention claimed is:

1. A rotary bleed valve assembly for controlling the flow of compressor gases in a gas turbine engine comprises a first passage and a second passage connecting in use with high pressure gases from a compressor and a valve member being adapted for rotary movement on an actuating shaft between said first passage and the second passage to vary flow of compressor gases there around, said valve member being shaped such that, as the valve member moves from a closed position to an open position flow of gas around the valve member induces a rotary torque on said valve member which causes said member to be urged towards said closed position when said valve member is in a preselected range of valve positions and towards said open position otherwise wherein said preselected range of valve positions is a range of positions intermediate between said open and said closed position, said valve member being rotatably received in a cylindrical seating disposed in said housing and between said first passage substantially at right angles thereto, said spool member being shaped in relation to its seating such that in a first angular position of the valve member relative to the seating the valve is closed whilst in a second angular position of the valve member relative to the seating gas can flow from the first passage through around the valve member to the second passage said seating incorporating two sealing bars that are parallel to the actuating shaft and said valve member being adapted to form a seal against said bars when in the second angular position.

2. A valve assembly according to claim 1 wherein the valve member has a generally L shaped tail portion.

3. A valve assembly according to claim 2 wherein said tail portion forms a seal against one of said sealing bars when said valve member is less than 10% open.

4. A valve assembly according to claim 1 wherein the valve member is shaped such that said induced rotary torque urges said valve member towards said closed position when said valve position is between 10% and 60% of fully open and towards said open position otherwise.

5. A valve assembly according to claim 1 additionally comprising a rotary actuator for moving said valve member.

6. A valve assembly according to claim 5 wherein the axis by which said valve member is moved by said actuator extends substantially perpendicular to the direction of gas flow in said passage.

7. A valve assembly according to claim 5 wherein movement of said valve member is electrically actuated and said valve assembly comprises sensing means for detecting the position of the valve member and means to receive the detected position information from said sensing means and to determine if there is any fault in operation of the valve assembly.

8. A valve assembly according to claim 7 wherein the position of the valve member is monitored by detecting the presence of compressor gas in the passage beyond the valve element.

9. A valve assembly according to claim 8 wherein the position of the valve member is monitored by monitoring the rotation of the actuating shaft.

10. A valve assembly according to claim 7 wherein the position of the valve member is monitored by monitoring the rotation of the actuating shaft and by detecting the presence of compressor gas in the passage beyond the valve member element.

11. A valve assembly according to claim 10 wherein two motor position sensors and one exhaust gas detection sensor are provided.

12. A valve assembly according to claim 1 wherein the shaping of said valve member is such that when the valve is opened there is a gas flow between the valve member and its seating on both sides of the axis of the valve member and the shaping of the valve member is such that as the valve opens, the torque effect acting on the valve member on both sides of its axis as a result of gas flow over the valve member results in a torque on the valve member.

13. A valve assembly according to claim 1 wherein motor drive shaft position is the primary mode of valve member position detection and compressor gas detection is secondary.

14. A valve assembly according to claim 1 including control means for monitioring outputs of valve member position detection sensors and when there is a discrepancy between sensor outputs, the control means drives the valve members accordingly and outputs a corresponding alarm code.

* * * * *